United States Patent
Forbes et al.

[11] Patent Number: 5,979,871
[45] Date of Patent: Nov. 9, 1999

[54] CLAMSHELL THROTTLE VALVE ASSEMBLY

[75] Inventors: Robert J. Forbes, Whitmore Lake; John Fiorini, Brighton; Mark Tuneff, Willis, all of Mich.

[73] Assignee: Ford Motor Company, Dearborn, Mich.

[21] Appl. No.: 09/050,183

[22] Filed: Mar. 30, 1998

[51] Int. Cl.⁶ ........................................................ F16K 1/22
[52] U.S. Cl. ............................................ 251/305; 123/337
[58] Field of Search .............................. 251/305; 123/337

[56] References Cited

U.S. PATENT DOCUMENTS

| | | |
|---|---|---|
| 4,465,260 | 8/1984 | Conley et al. . |
| 4,774,750 | 10/1988 | Platusich . |
| 4,777,977 | 10/1988 | Platusich . |
| 4,907,553 | 3/1990 | Porter . |
| 5,275,375 | 1/1994 | Semence . |
| 5,497,081 | 3/1996 | Wolf et al. . |
| 5,632,245 | 5/1997 | Ropertz . |
| 5,666,988 | 9/1997 | Becker . |
| 5,687,691 | 11/1997 | Kaiser et al. . |

FOREIGN PATENT DOCUMENTS

| | | |
|---|---|---|
| 2606115 | 5/1988 | France . |
| 2810683 | 9/1979 | Germany . |
| 3-160125 | 7/1991 | Japan . |

*Primary Examiner*—John Fox
*Attorney, Agent, or Firm*—Jerome R. Drouillard

[57] ABSTRACT

A combustion engine throttle valve includes a multipiece clamshell throttle body which is divided along an axis of rotation of a throttling member subassembly, which may be placed within the throttle body as one component. The throttle body further includes a face sealing ledge within the throttle body's air conduit, with the ledge being positioned so that the throttle plate will be in contact with the ledge when the plate is in the closed position, and such that the plate pivots perpendicularly off the ledge when opening. The clamshell design permits greater use of lighter plastics in place of metallic components and minimizes the number of parts through incorporation of plastic injection molding techniques.

5 Claims, 3 Drawing Sheets

CLAMSHELL THROTTLE VALVE ASSEMBLY

BACKGROUND OF THE INVENTION

1. Technical Field

The present invention relates to a throttle valve for an internal combustion engine. More particularly, this invention relates to a two-part clamshell throttle body which permits a one-piece, drop-in-place method of assembling a throttling member subassembly.

2. Disclosure Information

With advances in plastics technology, the automotive industry continues to push for the use of plastics in place of metal. Aside from weight reduction benefits, plastics are generally more corrosion resistant than many metals. Also, plastic molding techniques minimize complicated machining requirements and reduce the required number of parts so that assembly is simplified and cost is reduced.

The throttle valve is one automotive component which traditionally is composed of many parts. Unfortunately, the high precision relationship of these parts to one another, because of prior art configurations coupled with external environmental factors, has limited their makeup to metallic compositions as opposed to plastics. The use of plastics was not practical due to manufacturing process limitations along with material rigidity and expansion concerns.

Typical throttle valve designs include throttle bodies which are composed of a one-piece housing. This hinders the possibilities of simplifying the throttle valve manufacturing process since the throttle body's internal components (e.g., throttling member subassembly) must be assembled around and into the throttle body on a piece-by-piece basis. Such assembly techniques do not lead to a robust product and often create quality problems since it reduces the opportunities to utilize injection molded plastic technologies which serve to reduce the number of parts.

The present invention resolves this issue by providing a throttle body of a two-piece, clamshell design. With the clamshell, the throttling member subassembly can be constructed independent of the throttle body housing. Once constructed, the throttling member subassembly can then be dropped in place as one part. Without the clamshell design of the present invention, pre-assembly and utilization of injection molded plastics for the throttling member subassembly would be severely limited.

Combustion engine throttle valve art demands that air leakage through the valve be minimal in order to assure that established idle speeds are not erratic. The trend of the automotive industry is directed towards further reducing engine idle speeds. The lower the idle speed, the smaller the idle air flow demand around the throttle valve. Therefore, concerns about air leakage through the throttle valve, in today's market, has become ever more enhanced.

Prior art has minimized air leakage by maintaining a high precision fit between the throttle body bore (walls of the air conduit) and the pivotal throttle plate when in the closed position. To achieve this high precision, prior art has found it necessary to machine bore throttle bodies of cast aluminum and precision stamp throttle plates of a metallic composition. The necessary precision of this arrangement eliminates the opportunity to utilize plastics for the throttle body or the plate.

To further reduce the already low leakage rates, prior art has found it necessary to decrease the plate's closed idle angle position. The reduction of this angle, however, has increased the chances of the metallic plate becoming wedged against the internal cylindrical walls of the metallic throttle body as a result of misalignment or sludge buildup. To further explain, the plate's outer perimeter edge must conform to the internal walls in order to minimize air leakage through the throttle body when the plate is in the closed position. In fact, the tolerance between the plate edge and the wall is often so tight that the plate scrubs or scratches the wall as it pivots to an open position. If the scrubbing is excessive, the plate can become wedged in the closed position. The smaller the plate angle, or degree off-set, at closure, the greater the chances are of excessive scrubbing. Currently, sticking throttle valves, in the closed idle position, is a warranty concern with throttle valve assemblies. With past throttle body designs, a throttle plate with a zero degree off-set at closure was not advisable.

This invention resolves the wedging problems of prior are by utilizing a face sealing ledge. The high precision requirement between the plate's outer perimeter edge and the throttle body internal wall is eliminated because the plate edge no longer requires the surface of the tangentially positioned internal wall to minimize air leakage, but instead utilizes a parallel plane seating arrangement where the plate makes contact with the seat when in the closed position and pivots open, in a perpendicular direction, off of the seat. That is, when the plate pivots open, it lifts perpendicularly off of it's near zero leakage sealing surface instead of scraping along the interior walls of the throttle body.

Relying on the face sealing ledge to create a near zero air leakage rate is superior to relying on the longitudinal surfaces of the internal throttle body walls because it further limits air leakage necessary for today's slower idle speeds, and it eliminates the number one product warranty concern for throttle bodies, that of plate wedging.

French patent 2,606,115 displays a butterfly valve where the shell is divided along the shaft centerline. However, journals and spindles are utilized for end-play limitation and no mention is made of pressed on bearings as taught through this invention. Also, the two shell pieces of the prior art do not incorporate the concepts of a face/ledge seal, zero leakage, or zero plate angle as does the present invention. Instead, the prior art continues with the utilization of an idle stop screw.

German patent 5,687,691 shows a plastic throttling member lever arm which is made of plastic and formed about the end of a metallic shaft utilizing a slot as a means to resist torsion forces. No mention is made of a tang in place of the slot, nor is any mention made of a "slot-free" throttling shaft as taught through the present invention.

SUMMARY OF THE INVENTION

This invention summarizes a throttle valve assembly for use in an internal combustion engine having an air conduit with a longitudinal axis. The conduit is defined by a clamshell throttle body comprising an upper half and a lower half with a mating surface of the upper half and the lower half being in a common mating surface plane which is perpendicular to the longitudinal axis.

Specific to this invention, the throttle valve assembly also contains a one-piece, drop-in-place throttling member subassembly containing a throttle shaft having an axis of rotation perpendicular to the longitudinal axis and where the axis of rotation is contained within the mating surface plane; a throttle plate mounting slot that radially pierces the throttle shaft, lies along the axis of rotation, and is approximately centered axially on the throttle shaft; a first bearing and a second bearing for pivotally mounting the throttle shaft to the throttle body; and a throttle plate mounted through the throttle plate mounting slot.

The throttle shaft further comprises a first end and a second end, with the ends defining those portions of the throttle shaft which extend axially beyond the first bearing and the second bearing and the second end having a groove and a tang. The throttling member subassembly further including an injection molded plastic throttling member lever secured to the second end to respectively provide an axially and torsionally rigid throttle shaft and throttling member lever connection.

The throttling member subassembly's throttle plate may also be formed of injection molded plastic wherein the plastic is deposited within the throttle plate mounting slot such that the throttle plate is not free to rotate with respect to the throttle shaft. In addition, the plate mounting slot can be replaced with a planar deformation of the throttle shaft's circumference at the axial location of the throttle plate, thereby creating a slot-less form of the throttle shaft. Taking the injection molding feature one step further, the throttling member subassembly's throttle shaft, throttle plate, and throttling member lever can be made of one plastic part.

As previously stated, the throttle valve assembly contains a throttle body having an internal surface located about the longitudinal axis with the internal surface defining an air conduit. The throttle body also having two opposed coaxial bores in communication with the conduit and perpendicular to the longitudinal axis where the bores are formed by two sleeve shaped shoulders. The throttle valve assembly further includes the throttle plate having a top and bottom face located within the throttle body with the throttle plate adapted to rotate from a closed position that obstructs the air conduit flow, to an open position, with the throttle plate pivoting about an axis of rotation which is aligned and centered with the coaxial bores. And, specific to this invention, the throttle body has two opposed, coaxial, face sealing ledges defined by the internal surface of the throttle body, with each face sealing ledge extending approximately 180 degrees about the inner surface of the air conduit, and with the ledges being positioned in opposing axial directions such that 180 degrees of the periphery of the throttle plate top face and 180 degrees of the periphery of the throttle plate bottom face rest on the face sealing ledges when the throttle plate is in the closed position.

This invention further includes a method of making the throttle valve assembly by dropping-in-place the throttling member subassembly into the throttle body as one component. This is done by first providing the throttle body in two sections identified as a throttle body upper half and a throttle body lower half, with a dividing plane defining an axis of rotation for the throttling member subassembly, which axis of rotation is perpendicular to a longitudinal axis. The throttling member subassembly, including the throttle shaft, the throttle plate, the throttling member lever, a first bearing, and a second bearing is then dropped-in-place. The final step is securing the two throttle body halves about the throttling member subassembly.

The throttling member subassembly can be made in a variety of ways. A preferred method is to injection mold the throttle shaft, the throttle plate, and the throttling member lever as one plastic piece. The plastic must therefore be formed about the first bearing and the second bearing in one injection molded operation. A second method of making the throttle valve assembly entails pressure fitting the first bearing and the second bearing to a metallic throttle shaft, as opposed to plastic, prior to plastic injection molding of the throttling member lever to the second end of the metallic throttle shaft.

The objects of the current invention are certainly many-fold. The complexity of the manufacturing process is reduced by increasing symmetry, by reducing the number of required parts, and, where possible, by decreasing the number of varying parts. In addition, known warranty concerns, such as sticking throttle plates when in the closed position, are resolved by this invention.

Other advantages of the present invention will become apparent to the reader of this specification.

DETAILED DESCRIPTION OF PREFERRED EMBODIMENTS

Figure 2:
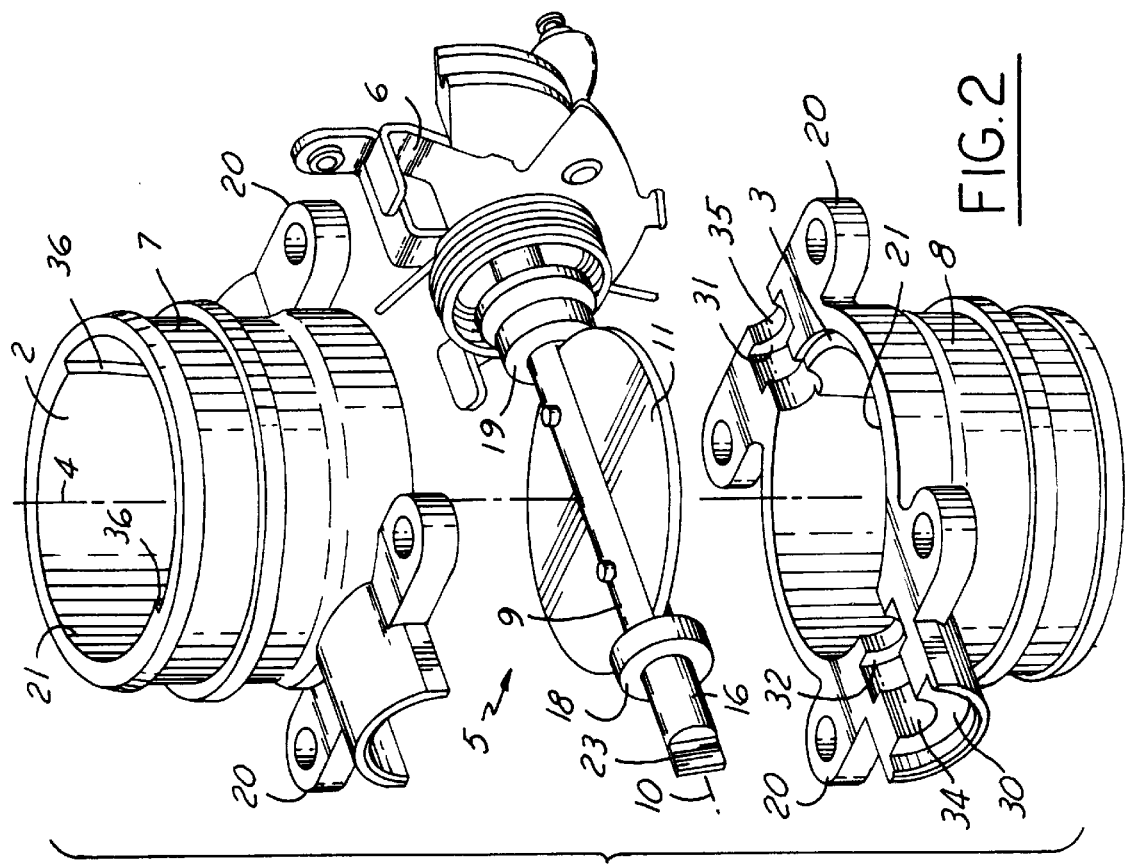
FIG. 2 is a three dimensional exploded view of FIG. 1.
Figure 1:
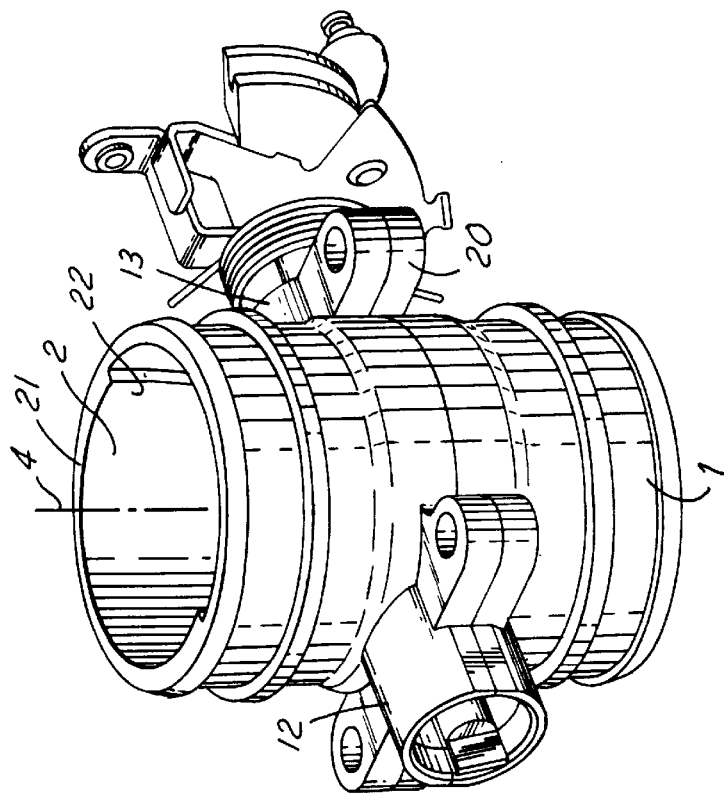
FIG. 1 is a three dimensional view of a throttle valve according to the present invention.

As shown in FIGS. 1 and 2, a throttling valve assembly comprises throttle body 1 with internal surface 21 defining air conduit 2 positioned about longitudinal axis 4. Throttling member subassembly 5 (see FIG. 2) has throttling member lever 6.

Throttle body 1 comprises first sleeve shaped shoulder 12 and second sleeve shaped shoulder 13 (see FIG. 1) defining first coaxial bore 34 and second coaxial bore 35 (see FIG. 2) which are opposed and in communication with air conduit 2. First and second coaxial bores 34 and 35 also house and support throttling member subassembly 5 along axis of rotation 10. Axis of rotation 10 is perpendicular relative to longitudinal axis 4.

Throttle body 1, as depicted in FIG. 2, comprises two parts, throttle body upper half 7 and throttle body lower half 8. Thus, it can be said that they combine to form a clamshell. Upper half 7 may also be identified as an air intake conduit.

Figure 5:
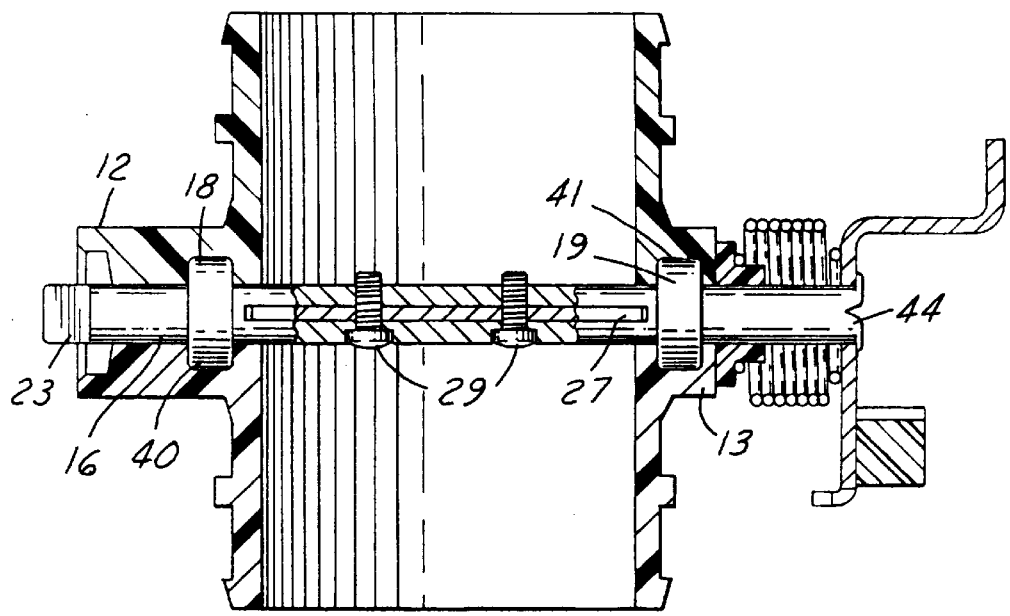
FIG. 5 is a cross sectional view of a typical throttle body without the face sealing ledge depicted in FIG. 4, without the molded throttling member lever depicted in FIG. 6, and where the view is rotated 90 degrees from that of FIG. 4.

Throttle body upper half 7 and throttle body lower half 8 are preferably identical and are formed so that throttle member subassembly 5 may be dropped-in-place complete with first bearing 18 and second bearing 19 (see also FIG. 5). Bearings 18 and 19 may comprise anti-friction bearings, or bushings, previously positioned or molded onto throttle member subassembly 5.

Throttle body halves 7 and 8 each have a number of mating extension armatures 20 (see FIG. 2). These armatures 20 each have one or more holes which propagate through both halves 7 and 8 for purposes of securing throttle body 1 to a mounting bracket (not shown) while holding halves 7 and 8 together. An alternate approach in securing halves 7 and 8 together is by providing a "snap together" connection (not shown) for purposes of simplifying assembly.

Figure 3:
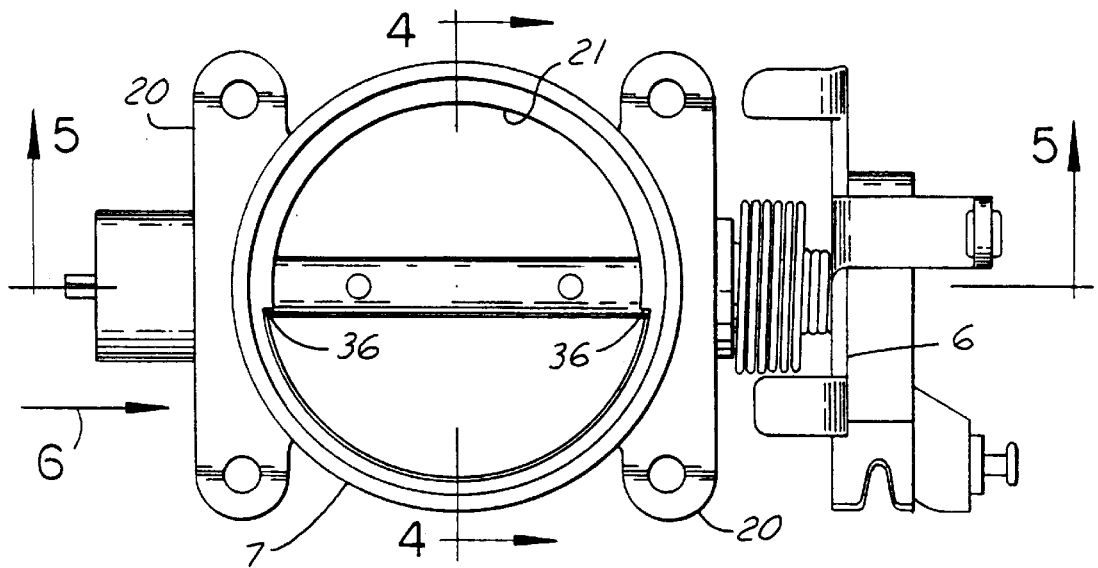
FIG. 3 is a plan view of the throttle valve of FIG. 1.
Figure 4:
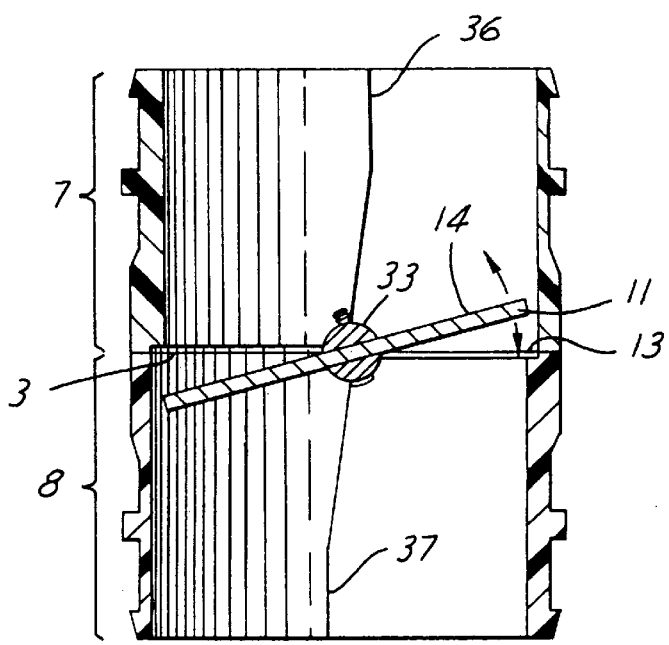
FIG. 4 is a cross sectional view of the air conduit and throttle plate depicting a face sealing ledge according to the present invention.

Internal surfaces 21, of throttle body halves 7 and 8, each define face sealing ledges 3 (see FIGS. 2 and 4). Face sealing ledges 3 tangentially extend approximately 180 degrees about internal surface 21, beginning and ending near axis of rotation 10. When halves 7 and 8 are mated, the resultant sealing ledges are in a coaxial opposed position and contained within parallel planes. The distance between the parallel planes is defined by the approximate thickness of throttle plate 11. The throttle plate, as shown in FIGS. 3 and 4, has top surface 14 and bottom surface 15, where 180 degrees of the peripheral top surface rests on face sealing ledge 3 of throttle body upper half 7 and approximately 180 degrees of peripheral bottom surface 15 rests on sealing ledge 3 of throttle body lower half 8, when throttle plate 11 is in the closed position.

As shown in FIG. 4, throttle plate 11 pivots from a closed position, such that it perpendicularly lifts off from face sealing ledges 3 and continues to a full open position where it makes physical contact with upper longitudinal shelf pair 36 and lower longitudinal shelf pair 37. Longitudinal shelf pairs 36 and 37 are positioned so that when throttle plate 11 is placed in the full open position, air travel resistance through air conduit 2 is minimized. When throttle plate 11 is in the full open position, throttle plate top face 14 contacts upper longitudinal shelf pair 36, shown in FIG. 4. In unison, throttle plate bottom face 15 makes direct contact with the lower longitudinal shelf pair 37. As noted above, throttle body 1 also includes first sleeve shaped shoulder 12 and second sleeve shaped shoulder 13 which are opposing, coaxial, and normal to longitudinal axis 4. Referring to FIG. 5, shoulders 12 and 13 form first bearing pocket 40 and second bearing pocket 41, respectively. As shown in FIG. 2, shoulders 12 and 13 each contain three annular surfaces: outer annular surfaces 30; outer annular surfaces 31 of first and second bearing pockets 40 and 41; and inner annular surfaces 32 of first and second bearing pockets 40 and 41. These annular surfaces 30, 31 and 32 are concentric about axis of rotation 10. First and second bearing pockets 40 and 41 house first bearing 18 and second bearing 19, respectively, of throttling member subassembly 5. Anti-friction bearings may be interchanged with the bushings.

Sleeve shaped shoulders 12 and 13 are also concentric about axis of rotation 10, and are bisected by the divisional plane of upper and lower throttle plate halves 7 and 8. Bisection of first and second sleeve shaped shoulders 12 and 13 is required so that throttling member subassembly 5 may be dropped-in-place with bearings 18 and 19 pre-positioned and pressed onto throttling member subassembly 5, as opposed to the bearings being pressed into the throttle body housing.

Figure 6:
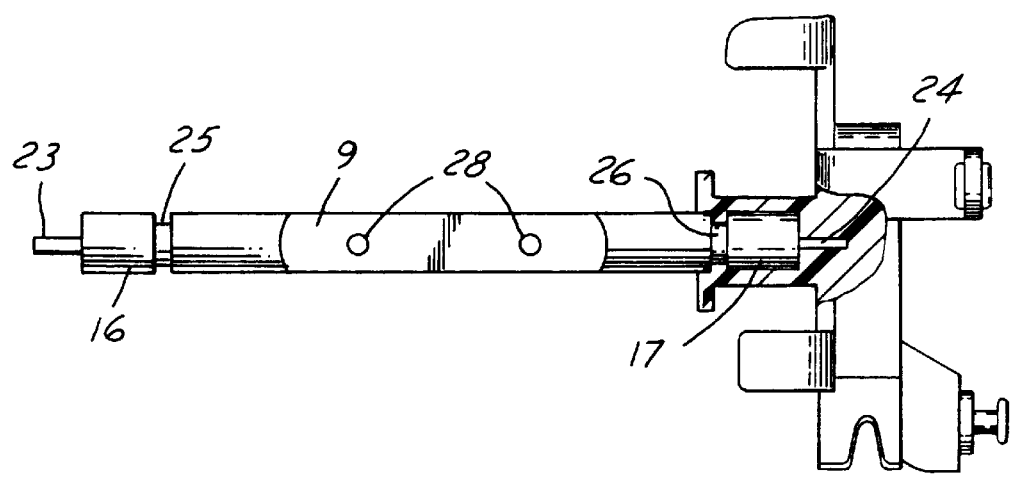
FIG. 6 is a partial cross sectional view showing the attachment of a throttle shaft to a plastic throttling member lever according to the present invention.

Referring to FIG. 2, throttling member subassembly 5 includes throttle shaft 9, first bearing 18, second bearing 19, throttle plate 11, and throttle member lever 6. As previously stated, throttling member subassembly 5 comes pre-assembled so that it may be placed within either throttle body half 7 or 8 as one component. Throttle shaft 9, as shown in FIGS. 5 and 6, includes: plate mounting slot 27 (FIG. 5); plurality of threaded set screw holes 28 (FIG. 6); first end 16 having first end tang 23 and first end groove 25 (FIG. 6); and second end 17 (FIG. 6) having second end tang 24 and required second end groove 26. First and second end groves 25 and 26 may also take the form of a slot or perforation.

For simplicity of manufacturing and assembly, throttle shaft 9 may be symmetric, beginning at its axial center point and extending outward in both opposing directions.

Plate mounting slot 27 must propagate along the axial center of throttle shaft 9, and penetrate radially through shaft 9 so that it may receive throttle plate 11. This plate is then secured utilizing plurality of set screws 29 so that the plate itself does not become misaligned from longitudinal axis 4. An alternative means of connecting plate 11 to shaft 9 is by producing a plate of plastic, wherein the plastic is injection molded about, and partially encapsulates, shaft 9. This encapsulation would be limited to an axial length of shaft 9 housed within air conduit 2. In order for throttle plate 9 to form a torsion bond with the shaft, this same plastic must mold within plate mounting slot 27 and the unused plurality of threaded set screw holes 28, should they exist. This molding process would occur prior to dropping-in-place of throttling member subassembly 5.

Torsionally secured to throttle shaft first end 16 may be a sensor such as a rotational position sensor. This sensor may or may not require first end groove 25 which could be utilized to eliminate axial movement of the sensor along throttle shaft 9.

Throttling member lever 6 is torsionally and axially secured to either typical throttle shaft second end 44 (FIG. 5), or, and specific to this invention, throttle shaft second end 17 (FIG. 6). Typically, a metallic second end 44 is crimped to a metallic lever, as shown in FIG. 5. However, utilization of throttle shaft second end groove 26 and second end tang 24, would permit the molding of a plastic throttling member lever 6 about throttle shaft second end 17, see FIG. 6, where the plastic encapsulates both groove 26 and tang 24. Use of tang 24, as opposed to an end slot, is also specific to this invention, and enables the molding of plastic lever 6 about metallic shaft 9 without worry of differing expansion coefficients. This molding concept, combined with the elimination of slots, may be extended to that of mounting plastic throttle plate 11. That is, plate mounting slot 27 and a plurality of threading set screw holes 28 can be replaced with a mere distortion of throttle shaft outer radial surface 33. This distortion should be limited to the location where plate 11 is molded to shaft 9, and must be severe enough so as to withstand the torsion forces of the air intake. With this accomplished, throttle shaft 9 is free of any machined slots.

While the invention has been shown and described in its preferred embodiments, it will be clear to those skilled in the arts to which it pertains that many changes and modifications may be made thereto without departing from the scope of the invention.

We claim:

1. A throttle valve assembly for use in an internal combustion engine, comprising;

an air conduit having a longitudinal axis;

a clamshell throttle body, defining the air conduit, with said throttle body having an upper half and a lower half and with mating surfaces of said upper half and said lower half being in a common mating surface plane which is perpendicular to said longitudinal axis; and a one-piece, drop-in-place, throttling member subassembly comprising:

a throttle shaft having an axis of rotation perpendicular to said longitudinal axis with said axis of rotation being contained within said mating surface plane, with said throttle shaft further having a throttle plate mounting slot which radially pierces said throttle shaft, lies along said axis of rotation, and is approximately centered axially on said throttle shaft;

a first bearing and a second bearing carried upon the throttle shaft for pivotally mounting the throttle shaft to throttle body, and with said throttle shaft further having a first end and a second end, with said ends being defined by those portions of said throttle shaft which extend axially beyond said first bearing and said second bearing, and with said second end having a groove and a tang, with said throttle shaft further comprising an injection molded plastic throttling member lever secured to said second end to respectively provide an axially and torsionally rigid throttle shaft and throttling member lever connection; and a throttle plate mounted through said throttle plate mounting slot.

2. A throttle body as set forth in claim 1, wherein said upper half and said lower half have substantially the same configuration.

3. A throttle body as set forth in claim 2, wherein said upper half and said lower half each contain a plurality of mating fastening armatures, with each of said armatures containing one or more mating mounting holes to secure said throttle body to a mounting structure.

4. A throttle valve assembly as set forth in claim 1, wherein said first end has a groove and tang which are substantially identical to said groove and said tang of said second end such that said throttle shaft is symmetrical about its midpoint.

5. A throttle valve assembly as set forth in claim 1, wherein said throttle plate is formed of injection molded plastic, wherein the plastic is deposited within said throttle plate mounting slot such that the throttle plate is not free to rotate with respect to the throttle shaft.

* * * * *